United States Patent
Wolf et al.

(10) Patent No.: US 8,688,325 B2
(45) Date of Patent: Apr. 1, 2014

(54) METHOD AND DEVICE FOR AUTOMATICALLY ACTUATING A LOCKING ELEMENT OF A VEHICLE

(71) Applicant: Volkswagen AG, Wolfsburg (DE)

(72) Inventors: Richard Wolf, Leipzig (DE); Bernd Ette, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 2 days.

(21) Appl. No.: 13/681,818

(22) Filed: Nov. 20, 2012

(65) Prior Publication Data

US 2013/0079985 A1 Mar. 28, 2013

Related U.S. Application Data

(63) Continuation of application No. PCT/EP2011/002256, filed on May 6, 2011.

(30) Foreign Application Priority Data

May 20, 2010 (DE) .......................... 10 2010 021 108

(51) Int. Cl.
*G06F 7/04* (2006.01)
*H04N 7/18* (2006.01)

(52) U.S. Cl.
USPC ................ 701/36; 348/77; 348/154; 700/237

(58) Field of Classification Search
None
See application file for complete search history.

(56) References Cited

U.S. PATENT DOCUMENTS

| | | | |
|---|---|---|---|
| 6,721,738 B2 * | 4/2004 | Verplaetse et al. | 700/237 |
| 7,172,115 B2 * | 2/2007 | Lauden | 235/380 |
| 2005/0212911 A1 * | 9/2005 | Marvit et al. | 348/154 |
| 2007/0234421 A1 * | 10/2007 | Ogino et al. | 726/19 |
| 2008/0068145 A1 | 3/2008 | Weghaus et al. | |
| 2008/0170776 A1 * | 7/2008 | Albertson et al. | 382/154 |
| 2008/0296926 A1 | 12/2008 | Hanzel et al. | |
| 2011/0063108 A1 * | 3/2011 | Aonuma et al. | 340/540 |
| 2011/0118946 A1 | 5/2011 | Reimann et al. | |
| 2011/0173574 A1 * | 7/2011 | Clavin et al. | 715/863 |
| 2011/0242303 A1 | 10/2011 | Giraud et al. | |
| 2011/0248820 A1 | 10/2011 | Gehin | |
| 2011/0276234 A1 | 11/2011 | Van Gastel | |

FOREIGN PATENT DOCUMENTS

| | | |
|---|---|---|
| DE | 101 06 400 A1 | 8/2002 |
| DE | 102004041709 | * 10/2005 |
| DE | 10 2004 055 982 A1 | 6/2006 |
| DE | 10 2006 015 930 A1 | 12/2006 |
| DE | 10 2006 037 237 A1 | 2/2008 |
| DE | 10 2006 044 112 A1 | 3/2008 |
| DE | 10 2007 023 140 A1 | 10/2008 |
| DE | 10 2007 051 543 A1 | 4/2009 |
| DE | 10 2009 017 404 A1 | 11/2009 |
| DE | 10 2009 030 274 A1 | 1/2010 |

(Continued)

*Primary Examiner* — Behrang Badii
*Assistant Examiner* — Demetra Smith-Stewart
(74) *Attorney, Agent, or Firm* — Muncy, Geissler, Olds & Lowe, P.C.

(57) ABSTRACT

In order to automatically actuate a locking element of a vehicle, movement of an object in a region surrounding the vehicle is detected. If the detected movement corresponds to at least one predefined movement profile, the locking element is automatically actuated. If the detected movement does not correspond to the at least one predefined movement profile, a further predefined movement profile is produced depending on the detected movement.

18 Claims, 3 Drawing Sheets

(56) References Cited

FOREIGN PATENT DOCUMENTS

| DE | 10 2008 063 366 A1 | | 7/2010 |
|---|---|---|---|
| EP | 1 902 912 A1 | | 3/2008 |
| FR | 2920172 A1 | * | 2/2009 |
| WO | WO 2009/024602 A1 | | 2/2009 |
| WO | WO2009155254 | * | 12/2009 |
| WO | WO 2010/037738 A1 | | 4/2010 |

* cited by examiner

Legend

1 – trunk lid
10 – vehicle
14 – mechanism for actuating
15 – control unit
16 – memory
17 – sensor
20 – device
30 – ID transmitter

METHOD AND DEVICE FOR AUTOMATICALLY ACTUATING A LOCKING ELEMENT OF A VEHICLE

This nonprovisional application is a continuation of International Application No. PCT/EP2011/002256, which was filed on May 6, 2011, and which claims priority to German Patent Application No. DE 10 2010 021 108.7, which was filed in Germany on May 20, 2010, and which are both herein incorporated by reference.

BACKGROUND OF THE INVENTION

1. Field of the Invention

The present invention relates to a method and a device for actuating a locking element of a vehicle through a movement of an object (for example, the movement of a foot).

2. Description of the Background Art

In the prior art, methods are known with which, e.g., a door of a motor vehicle can be opened through the movement of a leg, see for example DE 10 2009 017 404 A1 (which corresponds to US2011/0118946 and which is incorporated herein by reference), DE 10 2006 044 112 A1 (which corresponds to US2008/0068145), DE 10 2004 055 982 A1 or DE 101 06 400 B4. Moreover, it is known from DE 10 2007 051 543 A1 to store adaptable parameters for specific settings, for example of a belt or a seat, for a vehicle.

When using gesture-controlled sensors to open and close doors and covers or lids of a vehicle, movements of objects (for example hands or feet) are analyzed. In this process, according to the conventional art, the doors and covers or lids are only actuated when the movement of the corresponding object is evaluated as valid by an analysis algorithm. If the corresponding movement is not evaluated as valid, the corresponding door or cover or lid is not actuated, even if the movement is performed by a person authorized for the vehicle.

SUMMARY OF THE INVENTION

It is therefore an object of the present invention to make it easier to open and close doors and covers or lids of motor vehicles through gestures.

According to an embodiment, a method for automatically actuating a locking element (e.g., a door or cover or lid) of a vehicle is provided. In this method, a movement of an object (for example, a hand or a foot, but also a cane) in a specific region surrounding the vehicle is detected. The detected movement is compared to at least one predefined movement profile, with the locking element being actuated automatically if the detected movement matches the at least one movement profile. If the detected movement does not match the at least one predefined movement profile, then an additional predefined movement profile is created starting from the detected movement.

In other words, the detected movement is compared with one or more predefined movement profiles. If the detected movement matches one of these predefined movement profiles, the locking element is automatically actuated. If the detected movement does not match any of these predefined movement profiles, the detected movement is converted into an additional movement profile and stored. If another movement that matches this additional movement profile is subsequently detected within a parameterizable time period, the locking element of the vehicle is automatically actuated.

In this way, the method according to the invention tunes itself to the vehicle user in a self-learning and adaptive manner, by which means the number of invalid actuation attempts is reduced and the acceptance of the corresponding function of automatic actuation of the locking element is increased. By this means, the present invention has a learning capability for the movement of the object (e.g., a kicking movement) without the need to read manuals or perform system settings. Moreover, the method according to the invention can adapt to the shape, size, material properties (e.g., color), etc., of the object, so that the movement of a woman's foot, a man's foot, or a walking stick can be detected without problems.

In an embodiment of the method, the additional movement profile may only be stored as a predefined movement profile if an additional movement that matches this additional movement profile within certain tolerance limits is detected directly after detection of the movement that caused the creation of this additional movement profile.

This ensures that predefined movement profiles are not created anew when the authorized vehicle user has only inadvertently performed a movement that does not match his movement profile, e.g., because the user has merely walked past the locking element.

Furthermore, in an embodiment, the additional movement profile must be similar to a predefined default profile in order to be stored as a predefined movement profile. This ensures that the predefined movement profiles match a specific pattern (namely, the default profile).

In this system, the movement of the object can be detected with one sensor, but better with multiple sensors, of the vehicle. A behavior over time of an output of this at least one sensor is detected and compared with the predefined movement profiles. The detected movement of the object matches a predefined movement profile if the behavior over time of the sensor output matches a corresponding definition of a behavior over time of this movement profile within tolerance limits. In this context, the definition of the behavior over time of the movement profile can include an envelope curve within which the behavior over time of the sensor output must lie so that the detected movement matches this movement profile. This envelope curve can be defined by, e.g., specific features of the default signal behavior, wherein these features each define a predefined value range.

An optical sensor, a capacitive sensor, a thermal sensor, an infrared sensor, an ultrasonic sensor, or even a camera can be used as the sensor. A combination of sensors of different types is also possible.

According to an embodiment of the invention, the number of predefined movement profiles may be limited (for example, the number of predefined movement profiles can correspond to the number of seats in the vehicle). In this design, for each movement profile the corresponding number of detected movements of the object that match this movement profile is counted. If an additional movement profile is then detected that does not correspond to any of the predefined movement profiles currently stored, the predefined movement profile whose corresponding count is smallest is replaced by the additional movement profile.

In this way, the predefined movement profile that is used (activated) least often is replaced in each case by the additional movement profile.

In an embodiment, another method for automatically actuating a locking element of a vehicle is provided, in which a movement of an object in a region surrounding the vehicle is detected with one or more sensors. In accordance with this additional method according to the invention, the locking element is actuated automatically when the behavior over time of an output of the at least one sensor matches a behavior over time of at least one predefined movement profile within tolerance limits.

By the means that the behavior over time of the output of a sensor, or the behavior over time of the output of multiple sensors, is tested to determine whether it matches a behavior over time defined by the predefined movement profile, specific idiosyncrasies of the movement detected by means of the at least one sensor can be modeled, and hence tested with regard to the predefined movement profiles, much better than is the case with the conventional art, in which the only test is whether specific sensors react.

In this regard, it has in particular been found to be useful for each predefined movement profile to include a first movement of the object in a predefined direction and a second movement of the object in a direction essentially opposite to this predefined direction. In other words, each predefined movement profile describes a movement behavior with at least one change of direction.

By the means that each predefined movement profile has at least one change of direction, an erroneous actuation of the locking element of the vehicle, e.g., by an inadvertent movement in only one direction, is advantageously avoided.

According to an embodiment of the invention, the detection region in which the movement is detected can be indicated or signaled to the user when a movement that does not match at least one predefined movement profile is detected multiple times.

The indication of the detection region advantageously avoids having the user perform the movement of the object (even only partially) outside this detection region.

In an embodiment, the movement of the object in the region surrounding the vehicle can only be detected if a vehicle key or ID transmitter associated with the vehicle is substantially simultaneously detected in this surrounding region.

In this way, the corresponding sensors of the vehicle may only be supplied with energy when an authorized user is detected by the vehicle in the corresponding region surrounding the locking element. However, in order to activate a search for the vehicle key or ID transmitter in the surrounding region, it is generally customary to continuously activate at least one of the sensors that detect the movement of the object. In this case, the additional sensors required for complete detection of the movement are only activated as needed, e.g., when the at least one sensor responds.

The locking element of the vehicle is in particular a door or a cover or lid (e.g., a trunk lid) of the vehicle. The actuation of the locking element corresponds in particular to an opening of the locking element when the locking element is closed, and a closing of the locking element when the locking element is open. Naturally, it is also possible that not just one, but multiple locking elements of the vehicle (for example, all doors on one side of the vehicle) are actuated upon detection of a movement of the object corresponding to a predefined movement profile.

In an embodiment, a device for actuating a locking element of a vehicle is also provided. The device can include a mechanism for actuating the locking element, a control unit, a memory, and at least one sensor. The control unit detects the movement of an object in a region surrounding the vehicle by means of the at least one sensor. The control unit operates the mechanism for actuating the locking element when the control unit recognizes that the detected movement matches a movement profile stored in the control unit. In this design, one or more movement profiles can be stored in the memory. If the control unit does not recognize that the detected movement matches a movement profile stored in the control unit, the control unit creates an additional movement profile starting from the detected movement and stores it in the memory.

Further, another device for actuating a locking element of a vehicle can also be provided. The additional device also comprises a mechanism for actuating the locking element, a control unit, a memory, and at least one sensor. With the aid of the at least one sensor, the control unit detects a movement of an object in a region surrounding the vehicle. The control unit operates the mechanism for actuating the locking element when the control unit recognizes that a behavior over time of an output of the at least one sensor matches a corresponding definition of a behavior over time of one or more movement profiles stored in the control unit within tolerance limits.

The advantages of the device according to the invention and the additional device according to the invention correspond in essence to the advantages of the method according to the invention and the additional method according to the invention, so a repetition is omitted here.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
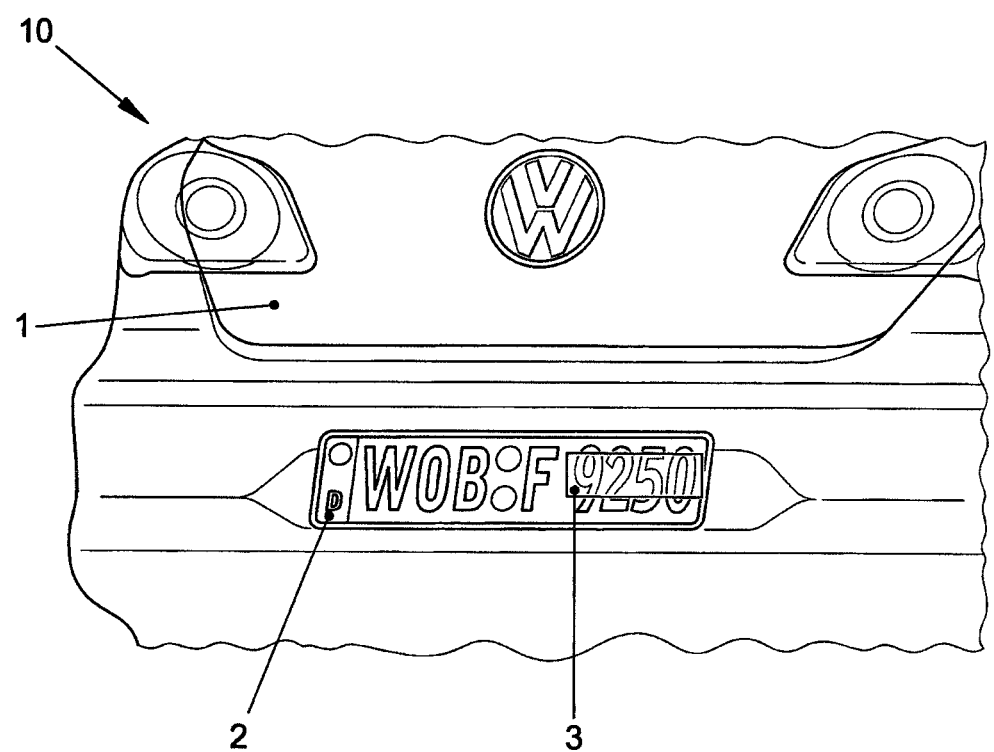
FIG. 1 illustrates a vehicle according to an embodiment of the invention from behind, wherein a detection region of sensors is made known to a user.

In FIG. 1, a vehicle 10 according to the invention with a trunk lid 1 is shown. A user of the vehicle 10 can open the trunk lid 1 by performing a kicking movement with his foot in the direction of the license plate 2 of the vehicle 10 while standing behind the vehicle 10.

An embodiment of the method according to the invention for actuating the trunk lid 1 can include the following steps:

Step 1: By means of sensors (not shown in FIG. 1), the foot movement is detected and converted into a movement profile (signal behaviors).

Step 2: This movement profile is compared with stored movement profiles (among them a default movement profile). If the movement profile or the detected foot movement matches one of the stored movement profiles, the trunk lid 1 is opened and the method is ended.

Step 3: If the movement profile does not match any of the stored movement profiles, the currently detected movement profile is temporarily stored, insofar as it has at least a certain similarity to the default movement profile, and detection of a repeat foot motion is awaited. If no repeat foot movement should be detected within a predetermined time, the temporarily stored movement profile is deleted and the method is ended.

Step 4: If a repeat foot movement does take place within the predetermined time, this foot movement is detected by the sensors and a new movement profile is created as a function of the detected foot movement. This new movement profile is compared with the temporarily stored movement profile. If the new movement profile matches the temporarily stored movement profile within tolerance limits, then firstly the trunk lid 1 is opened and secondly the temporarily stored movement profile is permanently stored. The method is ended. If the new movement profile does not agree with the temporarily stored movement profile, a light bar 3 is projected onto the license plate 2 for a specific time period, the temporarily stored movement profile is deleted, and the method continues from step 2.

If all memory locations for permanent storage of the temporarily stored movement profile are occupied, the movement profile that was used least frequently within a predefined time period, or least often matched the particular detected foot movement, is deleted. To this end, each stored movement profile has a counter that is incremented each time the corresponding movement profile matches the detected foot movement. In this regard, the default movement profile is never deleted (and thus also has no counter).

Figure 2:
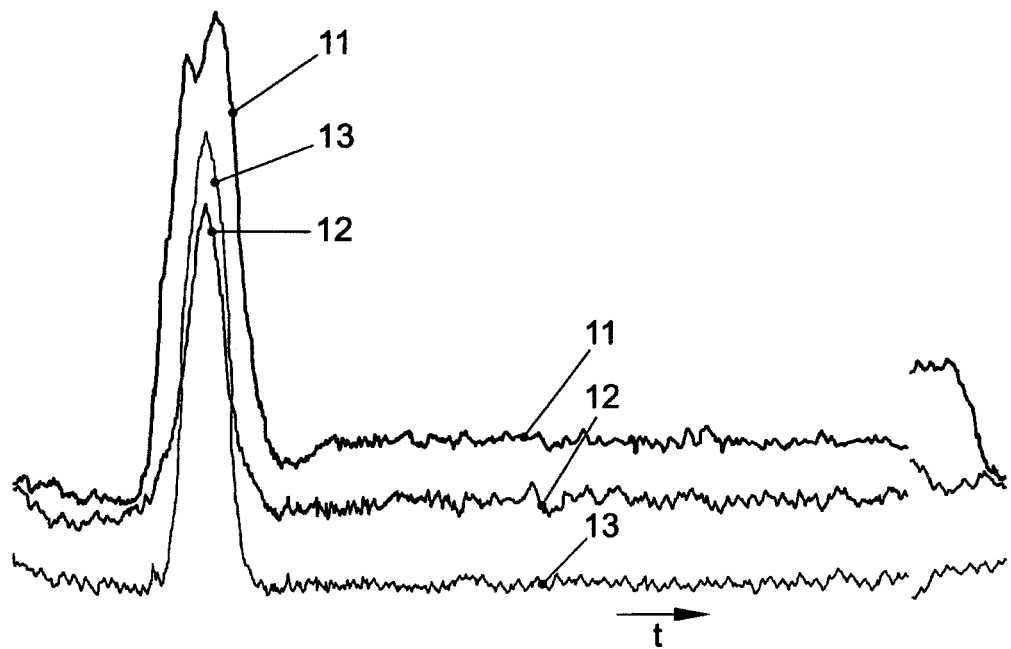
FIG. 2 illustrates behaviors of signals of three sensors during the detection of a movement of an object that corresponds to a predefined movement profile.

FIG. 2 shows three behaviors of signals 11-13, which are detected by optical sensors during a foot motion that is classified as correct. While the time t is shown on the x axis, the y axis represents the unit mV, which applies to all three FIGS. 2-4. The amplitude of the output of the sensors is thus proportional to the degree of reflection of an approaching object, so that the values on the y axis represent an intensity of the radiation reflected by the foot. The amplitude of the output of the sensors here can represent the distance from the relevant sensor to the corresponding object (the foot); however, this need not necessarily be the case according to the invention.

In the embodiment shown, there exist three LEDs for detecting the foot movement, arranged along the width direction of the vehicle 10 beneath the trunk lid 1 (e.g., in the rear diffuser). The light radiated by these three LEDs is reflected by the moving object (foot) and is received by a photodiode (part of the sensor). In FIG. 2 (and in FIG. 3 and FIG. 4 as well), the signal behavior 11 represents the intensity of the radiation from the left LED reflected by the foot, the signal behavior 12 represents the intensity of the radiation from the middle LED reflected by the foot, and the signal behavior 13 represents the intensity of the radiation from the right LED reflected by the foot. It is evident that the maxima of the three signal behaviors 11-13 in FIG. 2 occur at almost the same point in time, which is a criterion for the corresponding foot movement being a movement that is recognized as valid.

Figure 3:
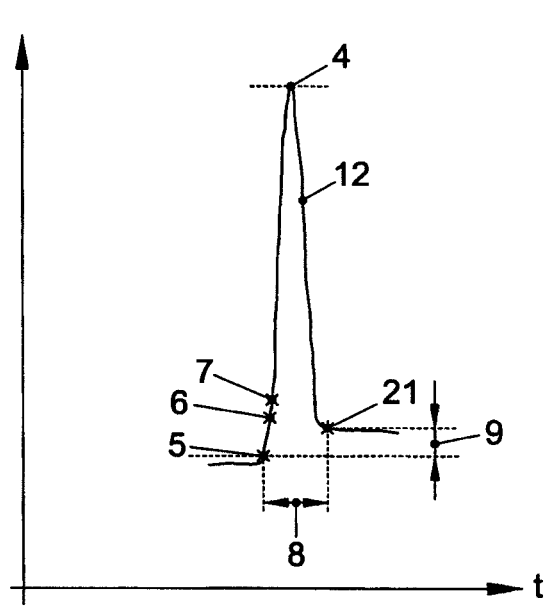
FIG. 3 illustrates certain characteristics of a behavior of a signal from a sensor.

FIG. 3 shows specific features of a signal behavior 12 as a function of the time t. The reference symbol 5 marks the start of rise, which is followed by a first rise point 6 and a second rise point 7. The slope of the line defined by the first rise point 6 and second rise point 7 is likewise a feature of the signal behavior 12. Other features of the signal behavior 12 are the maximum 4 of the signal behavior 12 and the so-called kick time 8, which extends between the start of rise 5 and the end of kick 21. The difference or height difference 9 between the y value of the start of rise 5 and the end of kick 21 specifies the point at which the foot appears at the start and end of the kick.

By appropriate determination of these features, a number of valid movements of the object (in this case the foot) are stored in a memory as a type of envelope curve. This envelope curve represents the default movement profile, which defines the optimal and predefined movement sequence of the object as possible signal behavior within specific parameter limits.

Figure 4:
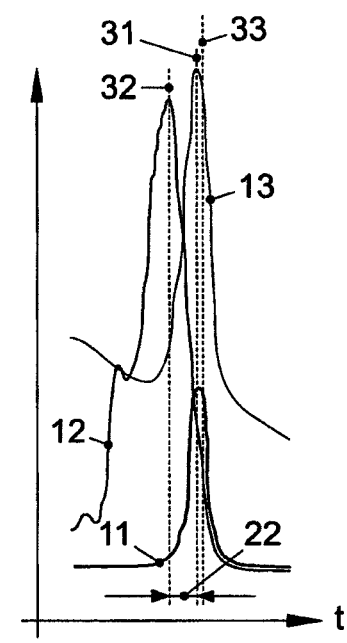
FIG. 4 illustrates behaviors of signals of three sensors during the detection of a movement of an object that does not correspond to any predefined movement profile.

FIG. 4 shows the three signal behaviors 11-13 for the case in which a person walks past behind the trunk lid 1. In other words, the signal behaviors 11-13 in FIG. 4 do not represent a valid movement profile. This is most evident from the positions in time 31-33 of the maxima of the signal behaviors 11-13, since the time separation 22 of these maxima is significantly larger than is the case for the signal behaviors 11-13 in FIG. 2.

Figure 5:
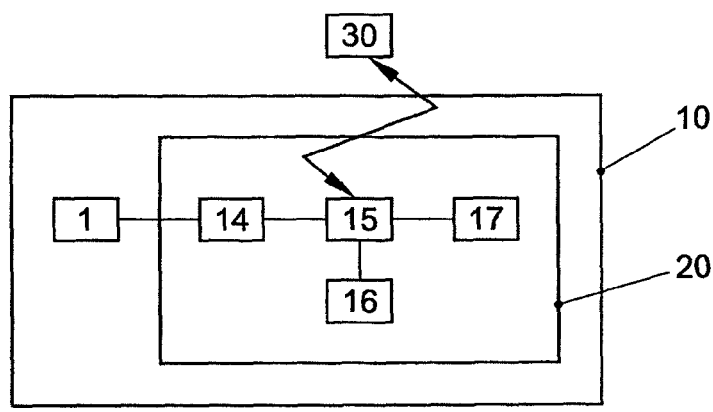
FIG. 5 schematically shows a vehicle according to an embodiment of the invention with a device according to the invention.

FIG. 5 schematically shows a vehicle according to the invention with a device 20 according to the invention and with a trunk lid 1. The device 20 according to the invention comprises, in addition to a control unit 15, a mechanism 14 for actuating (i.e., opening and closing) the trunk lid 1, a memory 16 for storing predefined movement profiles, and one or more sensors 17. When the control unit 15 detects an ID transmitter 30 authorized for the vehicle 10 in the vicinity of the trunk lid 1, it activates the sensor or sensors 17 in order to detect valid foot movements for actuating the trunk lid 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for automatically actuating a locking element of a vehicle, the method comprising:
   detecting a movement of an object over time in a region surrounding the vehicle;
   automatically actuating the locking element if the detected movement matches at least one movement profile; and
   creating an additional predefined movement profile as a function of the detected movement if the detected movement does not match the at least one predefined movement profile,
   wherein the movement of the object matches a predefined movement profile if the movement over time matches a behavior over time of the predefined movement profile.

2. The method according to claim 1, wherein the movement of the object is detected with at least one sensor, wherein a behavior over time of an output of the at least one sensor is detected, and wherein the movement of the object matches the predefined movement profile if the behavior over time of the output matches the behavior over time of the predefined movement profile within at least one tolerance limit.

3. The method according to claim 1, wherein each of the at least one movement profiles includes a first movement of the object in a predefined direction and a second movement of the object in a direction essentially opposite to this predefined direction.

4. The method according to claim 1, wherein a detection region in which the movement is detected is indicated when a movement that does not match the at least one predefined movement profile is detected multiple times.

5. The method according to claim 1, wherein the movement of the object in the surrounding region is only detected if a vehicle key associated with the vehicle is substantially simultaneously detected in the surrounding region.

6. The method according to claim 1, wherein the locking element is a door or a cover or a lid of the vehicle, and wherein the actuation of the locking element is an opening of the locking element when the locking element is closed, and is a closing of the locking element when the locking element is open.

7. A method for automatically actuating a locking element of a vehicle, the method comprising:
   detecting a movement of an object in a region surrounding the vehicle;
   automatically actuating the locking element if the detected movement matches at least one movement profile; and
   creating an additional predefined movement profile as a function of the detected movement if the detected movement does not match the at least one predefined movement profile,
   wherein the additional movement profile is only created if an additional movement that matches the additional movement profile is detected directly after detection of the movement that does not match the at least one predefined movement profile.

8. A method for automatically actuating a locking element of a vehicle, the method comprising:
   detecting a movement of an object in a region surrounding the vehicle;
   automatically actuating the locking element if the detected movement matches at least one movement profile; and
   creating an additional predefined movement profile as a function of the detected movement if the detected movement does not match the at least one predefined movement profile,
   wherein the at least one predefined movement profile comprises multiple predefined movement profiles, wherein a number of the predefined movement profiles is limited, wherein, for each movement profile, a corresponding number of detected movements of the object that match this movement profile is counted, and wherein the additional movement profile replaces the predefined movement profile whose corresponding count is smallest.

9. A method for automatically actuating a locking element of a vehicle, the method comprising:
   detecting a movement of an object in a region surrounding the vehicle with at least one sensor; and
   automatically actuating the locking element when a behavior over time of an output of the at least one sensor matches a behavior over time of at least one predefined movement profile within tolerance limits.

10. A device for actuating a locking element of a vehicle, the device comprising:
    a mechanism configured to actuate the locking element;
    a control unit;
    a memory; and
    at least one sensor, the device being configured such that the control unit detects a movement of an object in a region surrounding the vehicle via the at least one sensor such that the control unit operates the mechanism for actuating the locking element when the control unit recognizes that the detected movement matches at least one movement profile stored in the memory and such that the control unit stores an additional movement profile as a function of the detected movement in the memory if the control unit recognizes that the detected movement does not match the at least one stored movement profile,
    wherein the additional movement profile is stored as a predefined movement profile only if it is similar to a predefined default profile.

11. A device for actuating a locking element of a vehicle, the device comprising:
    a mechanism configured to actuate the locking element;
    a control unit;
    a memory; and
    at least one sensor, the device being configured such that the control unit detects a movement of an object in a region surrounding the vehicle via the at least one sensor such that the control unit operates the mechanism for actuating the locking element when the control unit recognizes that a behavior over time of an output of the at least one sensor matches a behavior over time of at least one movement profile stored in the memory,
    wherein an additional movement profile is stored in the device as a predefined movement profile only if it is similar to a predefined default profile.

12. A vehicle comprising:
    a locking element; and
    a device for actuating a locking element of a vehicle, the device comprising:
      a mechanism configured to actuate the locking element;
      a control unit;
      a memory; and
      at least one sensor, the device being configured such that the control unit detects a movement of an object in a region surrounding the vehicle via the at least one sensor such that the control unit operates the mechanism for actuating the locking element when the control unit recognizes that the detected movement matches at least one movement profile stored in the memory and such that the control unit stores an additional movement profile as a function of the detected movement in the memory if the control unit recognizes that the detected movement does not match the at least one stored movement profile,
    wherein the additional movement profile is stored as a predefined movement profile only if it is similar to a predefined default profile.

13. A method for automatically actuating a locking element of a vehicle, the method comprising:
    detecting a movement of an object in a region surrounding the vehicle;
    automatically actuating the locking element if the detected movement matches at least one movement profile; and
    creating an additional predefined movement profile as a function of the detected movement if the detected movement does not match the at least one predefined movement profile,
    wherein the additional movement profile is stored as a predefined movement profile only if it is similar to a predefined default profile.

14. A method for automatically actuating a locking element of a vehicle, the method comprising:
    detecting a movement of an object in a region surrounding the vehicle;
    automatically actuating the locking element if the detected movement matches at least one movement profile; and
    creating an additional predefined movement profile as a function of the detected movement if the detected movement does not match the at least one predefined movement profile,
    wherein each predefined movement profile describes a movement behavior with at least one change of direction.

15. A method for automatically actuating a locking element of a vehicle, the method comprising:
- detecting a movement of an object in a region surrounding the vehicle;
- automatically actuating the locking element if the detected movement matches at least one movement profile; and
- creating an additional predefined movement profile as a function of the detected movement if the detected movement does not match the at least one predefined movement profile,
- wherein if the additional predefined movement profile does not match the at least one movement profile, the movement profile is temporarily stored until a repeat movement of the object is detected.

16. The method according to claim 15, wherein if no repeat movement of the object is detected, then the additional predefined movement profile is deleted.

17. The method according to claim 15, wherein if a repeat movement of the object is detected a new movement profile is created and compared with the temporarily stored additional predefined movement profile.

18. The method according to claim 17, wherein if the new movement profile does not match the temporarily stored additional predefined movement profile a visual indication is provided.

* * * * *